Patented Sept. 6, 1949

2,481,080

UNITED STATES PATENT OFFICE 2,481,080

STABILIZATION OF UNSATURATED NITRILES

Robert C. Castner, Berkeley, and Leslie M. Peters, San Francisco, Calif., assignors to Shell Development Company, San Francisco, Calif., a corporation of Delaware No Drawing. Application April 6, 1948,
Serial No. 19,425

9 Claims. (Cl. 260—465.9)

This invention relates to the stabilization of unsaturated nitriles. More particularly the invention relates to a method for the prevention or inhibition of the auto-polymerization of unsaturated nitriles and to the novel compositions of matter resulting from the application of such a method.

More specifically the invention provides a method for the stabilization of alpha,beta-unsaturated nitriles against auto-polymerization occurring when the said nitriles are exposed to air, light and relatively high temperatures for short periods of time, which comprises incorporating with the said unsaturated nitriles a stabilizing amount of a para-hydrocarbon-substituted phenolic compound described hereinafter.

The invention further provides novel compositions of matter comprising the stabilized alpha, beta-unsaturated nitriles which may be subjected to relatively high temperatures, such as those incurred during fractional distillation, may be stored and shipped in contact with air, light and heat for relatively long periods of time without undergoing any destructive auto-polymerization, and may be subsequently utilized in the manufacture of many valuable materials.

Alpha,beta-unsaturated nitriles are compounds of great practical utility, being particularly adapted for use in the manufacture of synthetic rubbers and synthetic plastics. Substantially all of the alpha,beta-unsaturated nitriles, however, possess a characteristic which renders their use in industry very difficult. It has been found that when these unsaturated nitriles are exposed to air, light or relatively high temperatures for short periods of time they readily undergo auto-polymerization. This characteristic of the unsaturated nitriles to undergo auto-polymerization present particular problems during the refining and storage periods.

It has been found, for example, that when the alpha,beta-unsaturated nitriles are subjected to purification by fractional distillation there is a rapid formation of polymer which accumulates around the heating tubes, etc., preventing a proper heat transformation and causing a final stoppage of the distillation process. This is quite a serious operative inconvenience and it is highly desirable that some means be found to prevent or inhibit the formation of the polymers of the unsaturated nitriles during the refining period.

It has also been found that this defective characteristic of the unsaturated nitriles presents a serious problem in the final utilization of the monomeric material for its intended purposes. In a great many applications of the alpha,beta-unsaturated nitriles it is of utmost importance that the nitriles be employed only in the form of their monomers and if any polymer be present in the mixture unsatisfactory products invariably result. It is, therefore, desirous that some method be found for the preservation of the unsaturated nitriles in the monomeric form during their shipping and storage periods.

Attempts have been made in the past to prevent the auto-polymerization of the unsaturated nitriles by the incorporation with the said nitriles of polymerization inhibitors. The inhibitors that have been proposed heretofore have proved to be unsatisfactory for one or more reasons, such as (1) failing to prevent the unsaturated nitriles from undergoing auto-polymerization when exposed to the deteriorating elements, i. e., air, light and elevated temperatures, (2) failing to prevent the auto-polymerization of the unsaturated nitriles over a sufficiently long period of time, (3) requiring exceptionally large quantities of inhibitors to be employed to prevent the auto-polymerization, (4) being extremely difficult if not impossible to be separated from the unsaturated nitrile after they have served their purpose, and (5) imparting an undesirable odor or color to the said unsaturated nitriles.

Perhaps two of the most common inhibitors employed in the past to prevent the auto-polymerization of the unsaturated nitriles have been hydroquinone and catechol. While these inhibitors have been somewhat effective, in some cases, in slowing down the polymerization of the unsaturated nitriles, when they have been exposed to air, light and relatively low atmospheric temperatures they have proved to be entirely ineffective in preventing the polymerization of the unsaturated nitriles when the said nitriles have been exposed to relatively high temperatures such as might be employed during their purification by distillation or might be present in certain warm localities where the nitriles must be stored or shipped. It has been found, for example, that when solutions of unsaturated nitriles, such as methacrylonitrile, stabilized with hydroquinone have been subjected to fractional distillation at a temperature of the order of about 100° C. there has been rapid formation of a polymer of the said unsaturated nitrile comprising as high and sometimes higher than 15% of the total solution.

It is an object of the invention, therefore, to overcome the above-described difficulties and provide a practical and highly effective method for preventing or inhibiting the auto-polymerization of the unsaturated nitriles when the said nitriles are exposed to air, light or elevated temperatures for extended periods of time. It is a further object to provide a highly effective method for the stabilization of unsaturated nitriles against auto-polymerization which has occurred heretofore when the said nitriles have been exposed to relatively high temperatures, particularly those high distillation temperatures incurred during their final purification. It is still a further object of the invention to provide an auto-polymerization inhibitor which may be employed in relatively small quantities to stabilize unsaturated nitriles without imparting any undesirable odor or color to the said nitriles and may be readily removed, if desired, after its purpose has been served without injury to the unsaturated nitrile. It is a further object of the invention to provide novel compositions of matter comprising stabilized unsaturated nitriles which may be stored for long periods of time in contact with air, light and relatively high temperatures without undergoing any substantial polymerization. It is still a further object to provide novel compositions of matter comprising stabilized unsaturated nitriles which may be readily utilized for the manufacture of many valuable materials and articles. Other objects will be apparent from the detailed description of the invention given hereinafter.

It has now been discovered that these and other objects may be accomplished by the novel method of the invention which comprises incorporating with the unsaturated nitriles a stabilizing amount of a para-hydrocarbon-substituted phenolic compound described hereinafter. By the term "stabilizing amount" is meant an amount of the para-hydrocarbon-substituted phenolic compound sufficient to stabilize the unsaturated nitriles against auto-polymerization.

It has been further discovered that the compositions of matter resulting from the application of the process described above may be distilled at relatively high temperatures and subsequently stored for long periods of time in contact with air, light and heat without undergoing any substantial polymerization which would interfere with its later use in the production of the desired synthetic rubbers and resins.

The inhibitors provided by the present invention, i. e., the para-hydrocarbon-substituted phenolic compounds, possess none of the undesirable properties of the previously employed inhibitors as they impart no undesirable odor or color to the unsaturated nitriles, are employed effectively in low concentrations, are easily separated from the nitriles if desired, but otherwise may be retained with the unsaturated nitriles without any detrimental effect, and prevent and inhibit the auto-polymerization occurring when the unsaturated nitriles are exposed to relatively high temperatures, such as incurred during distillation, as well as preventing and/or inhibiting the auto-polymerization occurring when the nitriles are exposed to air and light.

Substantially any alpha,beta-unsaturated nitrile may be stabilized by the present invention. Compounds embraced by the term "alpha,beta-unsaturated nitrile" are those compounds of the general formula

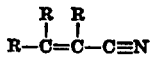

wherein R represents the same or different substituent selected from a group comprising a hydrogen atom, a halogen atom or an organic radical.

The halogen atoms which may be directly attached to one or more of the carbon atoms of the above-described general formula as represented by R may be any halogen atom, but are preferably chlorine, bromine, or iodine, and more preferably chlorine atoms.

R in the above general formula may be any organic radical. Preferred organic radicals are the hydrocarbon radicals and the substituted hydrocarbon radicals. The hydrocarbon radicals may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Examples of the hydrocarbon radicals are methyl, ethyl, propyl, isopropyl, n-butyl, isobutyl, tert-butyl, hexyl n-octyl, trimethyldecyl, allyl, methallyl, methyl, vinyl, carbinyl, pentenyl, hexenyl, phenyl diphenyl, naphthyl, anthryl, tolyl, dipropylnaphthyl, cyclohexenyl, trimethylcyclohexyl, cyclopentenyl, and the like.

The substituted hydrocarbon radicals represented by R are those hydrocarbon radicals described above wherein one or more hydrogen atoms have been replaced by an inorganic element or radical or by an organic radical containing one or more oxygen, nitrogen or sulfur atoms. Examples of the organic radicals, containing inorganic elements, that may be attached to the hydrocarbon radicals are the chlorine, bromine and iodine atoms, and the sulfate, sulfite, nitrate and nitrite radicals. Examples of the organic radicals, containing inorganic elements that may be attached to the hydrocarbon radicals are the hydroxyl, carboxyl, ether, thioether, and the like radicals. Examples of the substituted hydrocarbon radicals represented by R are hydroxyethyl, acetoxybutyl, chlorophenyl, 3-nitrophenyl, 4-bromoheptyl, acetylethyl, nitrocyclohexyl, and the like.

The radicals which R may represent also include the heterocyclic radicals in which an oxygen, nitrogen, sulfur, etc., atom or atoms is included in the ring system. Examples of such radicals are furfuryl, sulfolanyl, pyridinyl and the like.

Examples of unsaturated nitriles coming within the scope of the present invention are:

Acrylonitrile
Methacrylonitrile
Crotonitrile
Alpha-ethyl acrylonitrile
Alpha-propyl acrylonitrile
Alpha,beta-dimethyl acrylonitrile
Beta-ethyl acrylonitrile
Alpha-phenyl acrylonitrile
Alpha-naphthyl acrylonitrile
Alpha-(2-chlorobutyl) acrylonitrile
Alpha-(4-hydroxyphenyl) acrylonitrile
Alpha-furfuryl acrylonitrile
Beta-(2-chloroethyl) acrylonitrile
Alpha-butyl acrylonitrile
Beta-hexyl acrylonitrile A group of the above-described alpha,beta-unsaturated nitriles which are particularly active in the formation of polymers when allowed to stand alone in air or when exposed to elevated temperatures and which are readily stabilized by the method of the invention are those unsaturated nitriles possessing the above-described general formula wherein all of the R's are hydrogen atoms or wherein two of the R's are hydrogen atoms and the remaining R is a hydrocarbon radical containing from 1 to 18 carbon atoms. Examples of such a group are:

Acrylonitrile
Methacrylonitrile
Crotonitrile
Beta-ethyl acrylonitrile
Beta-hexyl acrylonitrile
Alpha-pentyl acrylonitrile
Beta-octyl acrylonitrile
Beta-n-decyl acrylonitrile The inhibitor employed in the process of the invention to stabilize the above-described unsaturated nitriles are the para-hydrocarbon substituted phenolic compounds. This term is meant to include all those phenolic compounds possessing a hydrocarbon radical attached to a nuclear carbon atom in a position para to the nuclear carbon atom bearing the hydroxyl group. A preferred group of the above-described stabilizing agents are those embraced by the formula:

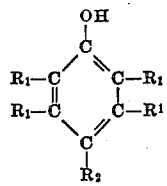

wherein $R_2$ is a hydrocarbon radical and each $R_1$ may be the same or different substituent selected from the group comprising a hydrogen atom, a halogen atom, a hydroxyl group, a substituted hydrocarbon radical, and an unsubstituted hydrocarbon radical. Coming within this preferred group are also those p-substituted phenolic compounds possessing the above described formula wherein two adjacent $R_1$'s are joined to the same bivalent organic radical so as to form one or more additional cyclic structures. Examples of this group of p-substituted phenolic compounds are those having the following formula:

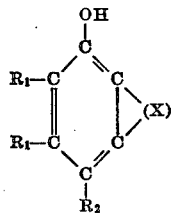

wherein $R_2$ is a hydrocarbon radical, each $R_1$ may be the same or different substituent selected from the group comprising a hydrogen atom, a halogen atom, a hydroxyl group, a substituted hydrocarbon radical, and an unsubstituted hydrocarbon radical, and X is a bivalent organic radical.

The hydrocarbon radicals designated by $R_2$ in the above-described formula of the stabilizing agents may be cyclic or acyclic, saturated, unsaturated, or aromatic. Examples of such hydrocarbon radicals are methyl, ethyl, propyl, butyl, isobutyl, tert-butyl, pentyl, hexyl, isohexyl, tert-octyl, allyl, methallyl, methyl vinyl carbinyl, pentenyl, hexenyl, phenyl, diphenyl, naphthyl, anthryl, tolyl, dipropylnaphthyl, cyclohexenyl, trimethylcyclohexyl, cyclopentyl and the like.

The $R_1$ of the above-described formula may be any halogen atom. The preferred halogens are chlorine, bromine, and iodine, with chlorine being the more preferred.

The unsubstituted hydrocarbon radicals which $R_1$ may represent in the above-described formula comprise the alkyl, alkenyl, aryl, alkaryl, alkenaryl, aralkyl, aralkenyl, cycloalkyl and cycloalkenyl radicals. Examples of the unsubstituted hydrocarbon radicals are methyl, propyl, isopropyl, hexyl, octyl, allyl, methyl vinyl carbinyl, phenyl, cyclohexyl, cyclopentenyl, naphthyl and the like.

The substituted hydrocarbon radicals represented by $R_1$ are those hydrocarbon radicals described above for $R_1$ wherein one or more hydrogen atoms have been replaced by an inorganic element or radical or by an organic radical containing one or more oxygen, nitrogen or sulfur atoms. Examples of the substituted hydrocarbon radicals are 3-chlorobutyl, 2,4-dibromocyclohexyl, acetoxyphenyl, 3-acetylheptyl, 2-hydroxypentyl, 3-nitro-4-heptenyl, propionylethyl and the like.

The organic radicals represented by X in the above described formula may be any bivalent organic radical of sufficient number of members to form a comparatively stable ring with the nuclear carbon atoms. The bivalent organic radical may be saturated or unsaturated and may be composed of inorganic elements in addition to the carbon atoms. Examples of such bivalent radicals are —$(CH_2)_3$—, —$(CH_2)_4$—,

—[$CH_2NH(CH_2)$]—

—$CH_2OCH_2$—, —$CH_2NHCH_2NH$—, and the like. Preferred organic radicals to be represented by X are the bivalent hydrocarbon radicals containing from 3 to 5 carbon atoms. When such preferred radicals are inserted into the above-described formula they form with the nuclear carbon atoms a cyclohexyl, phenyl, cyclohexenyl and the like radicals.

A particularly preferred group the above-described para-hydrocarbon-substituted phenolic compounds are those of the above-described general formula wherein $R_2$ is an alkyl radical containing from 1 to 10 carbon atoms and at least one of the $R_1$'s is a hydroxyl radical with the remaining $R_1$'s being a member of the group comprising hydrogen atoms and alkyl radicals.

Examples of the para-hydrocarbon substituted phenolic compounds to be used as stabilizing agents in the process of the invention are:

p-Ethyl phenol
p-Butyl resorcinol
p-Ethyl pyrogallol
4-isobutyl 2,5-dimethyl phenol
4-butyl 2-ethyl naphthol
4-tert-butyl 3,5-dichloroethyl phenol
p-Pentyl phloroglucinol
4-pentenyl 1,6,8-naphthalenetriol
4-phenyl 3-chlorophenol
4-cyclohexyl 1,6-anthracenediol
p-Octyl catechol
4-hexyl 1,5,6,7-naphthalenetetrol
4-phenyl 3-chloro catechol Examples of the more preferred para-hydrocarbon substituted phenols are the following:

p-Tert.-butyl catechol
p-Pentyl resorcinol
p-Isobutyl catechol
p-Heptyl pyrogallol
4-isobutyl 1,2,6-naphthalenetriol
p-Heptyl catechol
4-octyl 1,2,9-anthracenetriol
p-Octyl resorcinol
p-Octyl m-isobutyl catechol
p-Pentyl o-ethyl resorcinol The material to be stabilized in accordance with the invention may consist of one or more of the above-described unsaturated nitriles. The nitriles may be employed per se or in admixture with an organic solvent or diluent. The material may also consist of a reaction medium or various components one of which is the unsaturated nitrile whose polymerization is to be prevented during the course of the reaction.

The invention also embraces the stabilization of compositions comprising or consisting of any of the above-described unsaturated nitriles whose presence in the composition is desired in the monomeric form. The stabilizing agent may be added to the unsaturated nitrile before it is added to the composition medium or the stabilizing agent may be added to the composition with the unsaturated nitriles. The composition to which the stabilizing agent or unsaturated nitrile alone is added may be in any form desired as, for example, being dissolved in a solvent, etc.

The stabilizing agent to be added to the material being stabilized may consist of one or more of the above-described stabilizing agents. The inhibitors may be added per se or suspended or dissolved in a suitable media. It is generally desirable to select the specific stabilizing material with respect to the unsaturated nitrile to be stabilized so that the former is soluble to the desired extent in the latter. It may also be desirable to select the stabilizing agent with respect to the nitrile to be stabilized so that it may, if desired, be subsequently separated therefrom by some convenient method, such as distillation, extraction, and the like.

The quantity of the stabilizing agent to be added to the unsaturated nitrile to prevent or inhibit the auto-polymerization according to the process of the invention and to produce the novel compositions of matter encompassed thereby may vary within wise limits, but, for economical reasons, it is usually preferred to utilize the least possible amount of the said agent. This is usually between about 0.1% to about 3% by weight of the material being stabilized depending upon the degree of instability of the particular nitrile being refined or prepared for shipment, the period over which the nitrile must be preserved, and the particular stabilizing agent which is being employed. A particularly preferred range of quantities of stabilizing agent to be employed in the process of the invention lies between about .05% to about .1% by weight of the material being stabilized. The exact amount to be employed, however, may best be determined for each individual case.

The stabilizing agent may be added before or during the preparation or purification of the unsaturated nitriles, or at some stage following the final purification or preparation. In most cases it is preferred to add the stabilizing agent to the crude nitrile mixture before it is to be submitted to the final purification process.

The solution or composition comprising the stabilized unsaturated nitrile is able to withstand long periods of exposure to heat, light and air without undergoing any substantial polymerization. During the refining process, for example, the stabilized nitriles may be exposed to temperatures as high as or slightly higher than 130° C. for some time without undergoing any destructive polymerization. In the presence of air, and atmospheric temperatures such stabilized unsaturated nitrile compositions possess a resistance to auto-polymerization for many months.

As stated, the separation of the unsaturated nitriles from the inhibitors is easily accomplished, when considered desirable, by any suitable or convenient method comprising distillation, extraction and the like. It is usually advisable in most instances, however, to avoid the use of an alkaline wash in the separation process, particularly when the temperatures involved are above room temperatures, as such a procedure usually results in the destruction of the nitriles. The preferred method is to separate the unsaturated nitriles from the inhibitor by subjecting the stabilized mixture to fractional distillation and removing the nitrile overhead away from the less volatile stabilizing agent. In this preferred method of separation, i. e., fraction distillation, any suitable type of distillation apparatus may be utilized. In the operation of the distillation, it is preferred to add the desired stabilizing agent in the required amount to the crude mixture containing the unsaturated nitrile, place the resulting mixture in the boiler or kettle of the distillation apparatus and then subject the kettle to the desired temperature. The temperature employed during the distillation may vary over a considerable amount and will depend upon the particular unsaturated nitrile being purified, pressure, etc. In general, the distillation temperatures will run between about 60° C. to about 200° C. with a preferred range being between about 60° C. to about 130° C. Atmospheric, superatmospheric or subatmospheric pressure may be utilized in the distillation process. This method for the purification of the unsaturated nitriles may be carried to completion without impairment of proper heat transfer due to the accumulation of polymeric material on the heating tubes, etc.

To illustrate the effectiveness of some representative p-hydrocarbon substituted phenolic compounds in inhibiting the formation of polymers in the unsaturated nitrile compositions and solutions the following examples are cited. It is to be understood, however, that the examples are for the purpose of illustration and they are not to be regarded as limiting the invention in any way.

Example I

About .1% by weight of hydroquinone was added to a sample of crude methacrylonitrile. The resulting mixture was then placed in a distillation flask and distillation of the nitrile at a temperature of about 100° C. was commenced. Shortly after the distillation was started, a dark red, viscous polymer was formed in the distillation mixture. After a short time the formation of this polymer on the heating tubes caused a stoppage of its distillation.

Example II

About .1% by weight of p-tert-butyl catechol was added to a crude sample of methacrylonitrile and the resulting mixture was subjected to distillation (kettle temperature of about 90° C., skin temperature of about 130° C. and with the stillhead open to the atmosphere). There was no noticeable formation of polymer in the apparatus until after about 4.5 hours. At the conclusion of the distillation after 58 hours an analysis showed only about 0.4% of charge formed into non-volatile material. The methacrylonitrile was taken off overhead in a substantially pure form and could readily be utilized for any of its intended applications.

Example III

Sealed ampoules of methacrylonitrile containing about .1% p-tert-butylcatechol were heated in an oil bath at about 100° C. for about 168 hours. No polymers were detected until after 64 hours of heating and at the end of 168 hours less than 1% of the sample was polymerized.

Example IV

Sealed ampoules of methacrylonitrile containing about 0.1% of 4-isobutyl phenol are exposed to direct sunlight every day. No evidence of polymerization is seen after several days exposure. Unstabilized samples of methacrylonitrile under the same conditions begin to polymerize in a very few hours.

Example V

Sample of crotonitrile are stabilized with about .1% of a p-phenyl resorcinol and then stored in steel drums in contact with air at atmospheric temperature. No polymerization or discoloration of the samples is detected even after extended periods of storage.

Example VI

Sealed ampoules of alpha-ethyl acrylonitrile, alpha-propyl acrylonitrile, beta-ethyl acrylonitrile, alpha-phenyl acrylonitrile, alpha-cyclohexyl acrylonitrile, and alpha,beta-dimethyl acrylonitrile are stabilized against auto-polymerization by treating each sample with about .2% by weight of p-cyclohexyl pyrogallol. After extended periods of exposure to sunlight, very little, if any, polymerization or discoloration is detected in the above samples.

Example VII

Samples of alpha-choroethyl acrylonitrile are treated with about .1% by weight of each of the following para-substituted phenol compounds: p-hexyl phloroglucinol, p-octyl resorcinol, 4-cyclohexyl 1,6-anthracenediol, p-phenyl pyrogallol, p-octyl m-chloroethyl catechol and 4-octyl 1,2,9-anthracenetriol. After extended periods, very little polymerization or discoloration is detected in the above samples.

We claim as our invention:

1. The method of inhibiting the auto-polymerization of acryonitrile which comprises incorporating therewith from about .01% to about 3% by weight of para-tert-butyl catechol.

2. A method of purifying methacrylonitrile which comprises distilling the crude mixture containing the methacrylonitrile in the presence of from .01% to 3% by weight of p-tert-butyl catechol.

3. The method of inhibiting the auto-polymerization of methacrylonitrile which comprises incorporating therewith from about .01% to about 3% by weight of para-phenyl resorcinol.

4. The method of inhibiting the auto-polymerization of a nitrile selected from the group consisting of acrylonitrile, the alpha-substituted acrylonitriles wherein the substituent on the alpha carbon atom is a lower alkyl radical, and the beta-substituted acrylonitriles wherein the substituent on the beta carbon atom is a lower alkyl radical, which comprises incorporating therewith from .01% to 3% by weight of para-tert-butyl catechol.

5. The method of inhibiting the auto-polymerization of a nitrile selected from the group consisting of acrylonitrile, the alpha-substituted acrylonitriles wherein the substituent on the alpha carbon atom is a lower alkyl radical, and the beta-substituted acrylonitriles wherein the substituent on the beta carbon atom is a lower alkyl radical, which comprises incorporating therewith from about .01% to 3% by weight of a para-hydrocarbon-substituted phenol.

6. As a composition of matter acrylonitrile containing from .01% to 3% by weight of para-tert-butyl catechol dissolved therein.

7. As a composition of matter methacrylonitrile containing from .01% to 3% by weight of p-tert-butyl catechol dissolved therein.

8. As a composition of matter a nitrile selected from the group consisting of acrylonitrile, the alpha-substituted acrylonitriles wherein the substituent on the alpha carbon atom is a lower alkyl radical, and the beta-substituted acrylonitriles wherein the substituent on the beta carbon atom is a lower alkyl radical, and from .01% to 3% by weight of para-tert-butyl catechol dissolved therein.

9. As a composition of matter a nitrile selected from the group consisting of acrylonitrile, the alpha-substituted acrylonitriles wherein the substituent on the alpha carbon atom is a lower alkyl radical, and the beta-substituted acrylonitriles wherein the substituent on the beta carbon atom is a lower alkyl radical, and from .01% to 3% by weight of a para-hydrocarbon-substituted phenol.

ROBERT C. CASTNER.
LESLIE M. PETERS.

REFERENCES CITED

The following references are of record in the file of this patent:

UNITED STATES PATENTS

| Number | Name | Date |
|---|---|---|
| 2,125,685 | Nicodemus et al. | Aug. 2, 1938 |
| 2,181,102 | Stoesser et al. | Nov. 21, 1939 |
| 2,232,785 | Howk | Feb. 25, 1941 |
| 2,301,131 | Lichty | Nov. 3, 1942 |
| 2,356,247 | Kirk et al. | Aug. 22, 1944 |
| 2,402,113 | Hatch et al. | June 11, 1946 |

Certificate of Correction

Patent No. 2,481,080 September 6, 1949

ROBERT C. CASTNER ET AL.

It is hereby certified that error appears in the printed specification of the above numbered patent requiring correction as follows:

Column 9, line 49, for "acryonitrile" read *acrylonitrile*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*